United States Patent [19]

Utsunomiya et al.

[11] Patent Number: 5,625,513
[45] Date of Patent: Apr. 29, 1997

[54] FLOATING HEAD SLIDER HAVING UNIFORM SPACING FROM RECORDING MEDIUM SURFACE

[75] Inventors: Motoyasu Utsunomiya; Hiroshi Kajitani, both of Tokyo, Japan

[73] Assignee: NEC Corporation, Japan

[21] Appl. No.: 557,740

[22] Filed: Nov. 13, 1995

[30] Foreign Application Priority Data

Nov. 14, 1994 [JP] Japan .................... 6-278832

[51] Int. Cl.$^6$ .................................... G11B 21/21
[52] U.S. Cl. .................................... 360/103
[58] Field of Search .................................... 360/103

[56] References Cited

U.S. PATENT DOCUMENTS

| | | | |
|---|---|---|---|
| 5,212,608 | 5/1993 | Yoneoka | 360/103 |
| 5,287,235 | 2/1994 | Cunningham et al. | 360/103 |
| 5,343,343 | 8/1994 | Chapin | 360/103 |
| 5,396,387 | 3/1995 | Murray | 360/103 |
| 5,488,524 | 1/1996 | Cunningham | 360/103 |
| 5,515,219 | 5/1996 | Ihrke et al. | 360/103 |

FOREIGN PATENT DOCUMENTS

| | | | |
|---|---|---|---|
| 62-164204A | 7/1987 | Japan | 360/103 |
| 3-76070A | 4/1991 | Japan | 360/103 |
| 4355289 | 12/1992 | Japan | G11B 21/21 |
| 91-06397 | 5/1991 | WIPO | 360/103 |

OTHER PUBLICATIONS

Mitsuya et al, Flying Head Design Featuring a Constant Spacing During Head Positioning Over IDSK Surface. March 31, 1993.

Odaka et al, Flying Characteristics of Arbitrarily Shaped Slider for Magnetic Disk Files. Aug. 26, 1992.

Kohira et al, Method for Designing Flying Height Profile of Slider for Magnetic Disk Drive With Rotary Actuator. Aug. 26, 1993.

Ishii et al, Flying Characteristics of a Four Pad Slider. Mar. 31, 1993.

Primary Examiner—John H. Wolff
Attorney, Agent, or Firm—Hayes, Soloway, Hennessey, Grossman & Hage, P.C.

[57] ABSTRACT

A floating head slider has a pair of side rails and a central rail on a air bearing surface thereof. Each of the side rails has a first, leading region extending parallel to the longitudinal axis of the slider, a second, intermediate region extending from the first region and deviating from the direction of the longitudinal axis toward the other of the side rails, and a third, trailing region extending from the second region and further deviating from the direction of the first region. The directions of the first, second and third regions correspond to the direction of the air flow at the innermost track, intermediate track and the outermost track, to provide constant floating height and reduced roll. The central rail has a neck between a leading, small width region and a trailing, increasing width region.

14 Claims, 10 Drawing Sheets

FLOATING HEAD SLIDER HAVING UNIFORM SPACING FROM RECORDING MEDIUM SURFACE

BACKGROUND OF THE INVENTION (a) Field of the Invention

The present invention relates to a floating head slider for disk drives in which a read/write head floats over the surface of a rotating disk with a small spacing therefrom by an air bearing effect.

(b) Description of Related Art

In a magnetic disk drive used as an external storage device for a computer, a floating magnetic head slider, which floats over a surface of a recording medium with a constant spacing, is used to read and write information. The magnetic head slider has an air bearing surface (hereinafter referred to as an "ABS") opposing the recording medium. ABS receives a viscous flow of air which is produced by the rotation of the recording medium, and the magnetic head slider floats over the surface of the recording medium with a small spacing therefrom due to an air bearing effect. At a trailing edge of the ABS from which air exits, a magnetic head is attached such that the gap of the magnetic head opposes the surface of the recording medium. With this structure, non-contact recording and reproduction of information are performed to and from the recording disk.

Figure 1A:
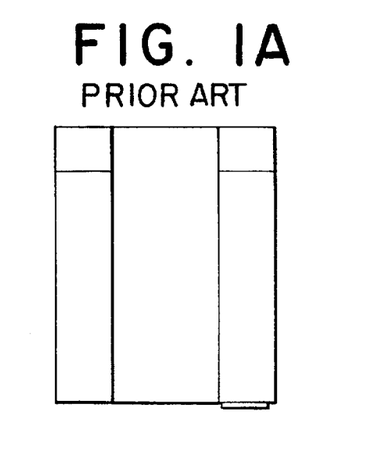
FIGS. 1A and 1B show a plan view and an end view, respectively, of a first example of a conventional magnetic head slider.
Figure 1B:
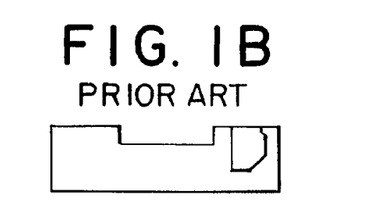
Figure 2A:
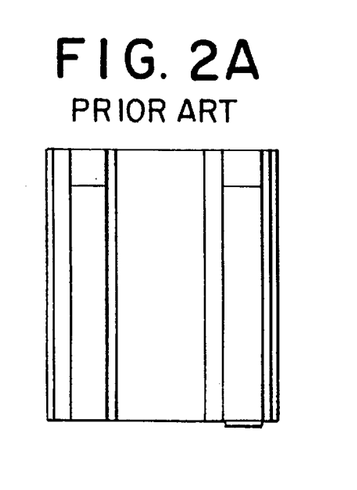
FIGS. 2A and 2B show a plan view and an end view, respectively, of a second example of a conventional magnetic head slider.
Figure 2B:
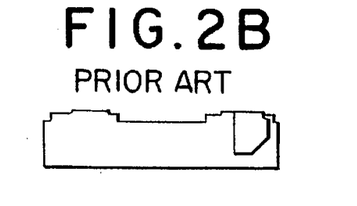
Figure 3A:
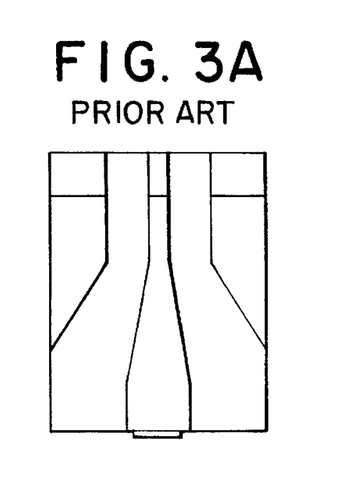
FIGS. 3A and 3B show a plan view and an end view, respectively, of a third example of a conventional magnetic head slider.
Figure 3B:
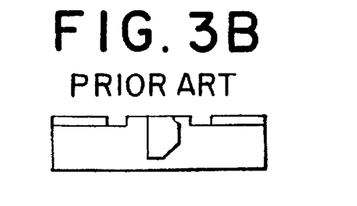

FIGS. 1A and 1B, FIGS. 2A and 2B and FIGS. 3A and 3B show examples of conventional floating head sliders as described above. FIGS. 1A and 1B show a plan view and an end view, respectively, of a two-rail slider in which two side rails parallel to each other are disposed on both transverse edges of the ABS. FIGS. 2A and 2B show, similarly to FIGS. 1A and 1B, a TPC (Transverse Pressure Contour) slider in which small steps are formed on both sides of each of the side rails to produce a negative pressure. FIGS. 3A and 3B show, similarly to FIGS. 1A and 1B, a three-rail slider in which a central rail is interposed between two side rails disposed at both transverse edges of the ABS.

Here, the structure and performance of a floating head slider will be described in more detail using an example of the two-rail structure of FIG. 4.

Figure 4:
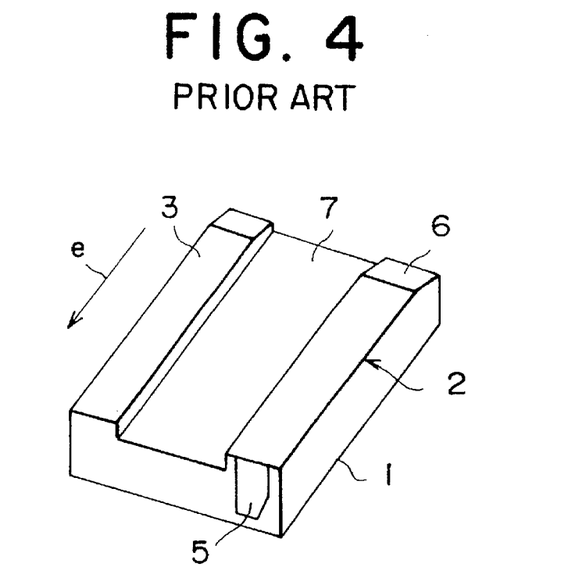
FIG. 4 is a perspective view of the conventional magnetic head slider shown in FIGS. 1A and 1B.

In FIG. 4, magnetic head slider 1 has a central recess 7 in the ABS 2 opposing a recording medium. The recess 7 longitudinally penetrates the magnetic head slider 1 and has a constant width over the entire length thereof. Two side rails 3 are disposed on both sides of the recess 7 such that they extend in the direction of arrow "e" of an air flow produced due to the rotation of the recording medium. Slopes 6 are formed at leading edges of the side rails 3, and a magnetic head 5 is formed on the trailing end surface of the slider 1 with a magnetic gap thereof disposed at the trailing edge of one of the side rails 3.

In operation, air enters along the slopes 6 and flows between the medium surface and the side rails 3, so, that air is compressed so as to form an air film between the surface of the recording medium and each of the side rails 3, thereby generating a positive pressure for bearing the magnetic head slider 1 over the medium surface.

Figure 5:
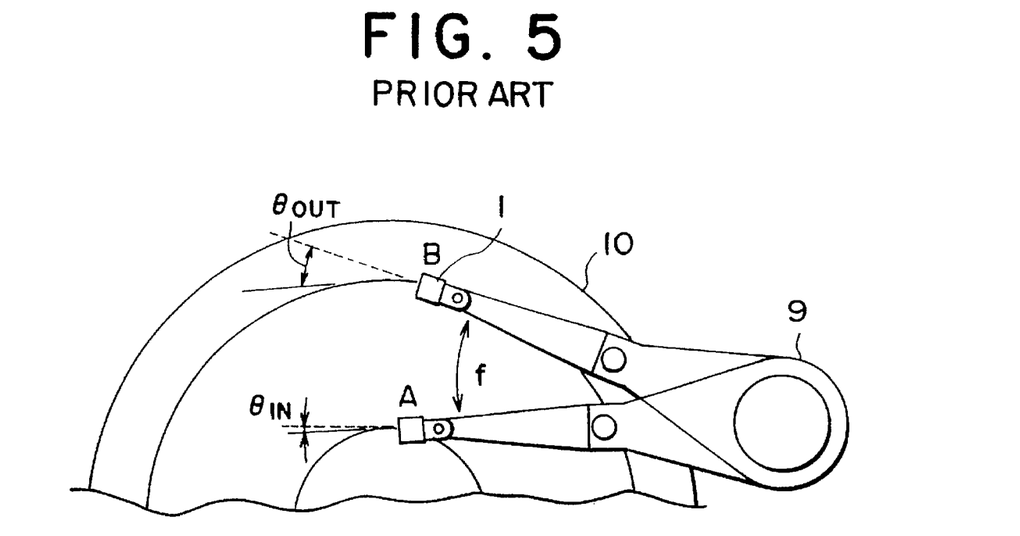
FIG. 5 is a plan view showing movement of a magnetic head slider during a seeking operation.

FIG. 5 shows movement of the magnetic head slider 1 effected by a positioner 9 for data accessing. The structure shown in the drawing is called a rotary actuator type. The positioner 9 swings, as indicated by arrow "f", along the medium surface 10 in a seeking operation. For data accessing, the magnetic head slider 1 is moved between the innermost track A and the outermost track B. During the seeking operation, the velocity of the magnetic head slider 1 relative to the medium surface varies depending upon of the radial position of the magnetic head slider 1 over the recording medium. This causes variations in the pressure generated along the ABS 2 of the magnetic head slider 1. The variation in pressure in turn generates the variation in the floating height of the slider dependent upon the radial position.

In the rotary actuator type, the skew angle depends on the radial position of the slider over the medium surface 10. The skew angle is defined as an angle between the direction of the longitudinal axis of the slider and the direction of the air flow running along the line tangent to the track. In general, the skew angle $\Theta in$ at the innermost track is designed to be approximately zero or a minus value while the skew angle $\Theta out$ is designed to be between about 20 and 30 degrees, as shown in the drawings. Accordingly, the floating height, which also depends on the compression length of the air flow, varies between the innermost track and the outermost track. The skew angle also affects the attitude of the slider.

The variation in the floating height of the magnetic head slider 1 causes variation in the efficiency of the magnetic head in electro-magnetic conversion, thereby deteriorating the SNR of reproduced signals. To achieve high density recording which is ever-requested in the field of magnetic disk drives, it is necessary to maintain a constant floating height of the magnetic head slider over all the tracks.

Japanese Patent Publication No. JP-A-4(1992)-355289 discloses a floating head slider having a small width center or neck between a leading edge and a trailing edge of each of the side rails, so as to decrease variations in the floating height of the head slider. However, this structure has been used only in two-rail sliders and it is difficult to employ the structure in a three-rail structure because of its high pitch angle caused by the large width leading edges of the rails. Further, since the slider has a skew angle with respect to the flow of air, roll of the slider increases. The amount of roll also greatly affects the floating characteristics in such a two-rail slider, so that the floating height and roll should be severely selected to maintain constant read/write characteristics of the magnetic head over all the tracks.

SUMMARY OF THE INVENTION

In view of the foregoing, it is an object of the present invention to provide a floating magnetic head slider which can reduce variations in the floating height of the slider at different radial positions over a recording medium surface so as to provide a constant floating height over all the recording tracks, thereby improving the read/write characteristics and achieving constant density recording (CDR).

According to a first aspect of the present invention, there is provided a floating magnetic head slider comprising an air bearing surface having a longitudinal axis thereof, the air bearing surface having a leading edge and a trailing edge extending perpendicular to the longitudinal axis, a pair of side rails disposed on the air bearing surface and in symmetry to each other with respect to the longitudinal axis, each of the side rails having a first region disposed adjacent to the leading edge and extending parallel to the longitudinal axis, a second region extending from the first region in a first direction deviated from the direction of the longitudinal axis toward the longitudinal axis by a first angle, and a third region extending from the second region in a second direction deviated from the direction of the longitudinal axis toward the longitudinal axis by a second angle, the second angle being larger than the first angle.

According to a second aspect of the present invention, there is provided a floating head slider comprising an air bearing surface having a longitudinal axis thereof, the air bearing surface having a leading edge and a trailing edge extending perpendicular to the longitudinal axis, a pair of side rails disposed on the air bearing surface and in symmetry to each other with respect to the longitudinal axis, each of the side rails having a first region disposed adjacent to tile leading edge and extending substantially parallel to the longitudinal axis, and a second region extending from the first region and forming an arcuate shape, the arcuate shape being concave as viewed from the longitudinal axis.

According to a third aspect of the present invention, there is provided a floating head slider comprising an air bearing surface having a longitudinal axis thereof, the air bearing surface having a leading edge and a trailing edge extending perpendicular to the longitudinal axis, a pair of side rails disposed on the air bearing surface and in symmetry to each other with respect to the longitudinal axis, and a central rail disposed on the air bearing surface between the pair of side rails, the central rail having a first region adjacent to the leading edge, a second region adjacent to the trailing edge, and a neck disposed between the first region and second region, the first region extending substantially parallel to the longitudinal axis, at least a portion of the first region has an increasing width as viewed toward the trailing region, the neck having a width smaller than the width of portions of the first region and second region adjacent to the neck.

BRIEF DESCRIPTION OF THE DRAWINGS

The above and other objects, features and advantages of the present invention will be more apparent from the following description, referring to the accompanying drawings in which.

DESCRIPTION OF THE PREFERRED EMBODIMENTS

Embodiments of the present invention will now be described with reference to the accompanying drawings.

Figure 6A:
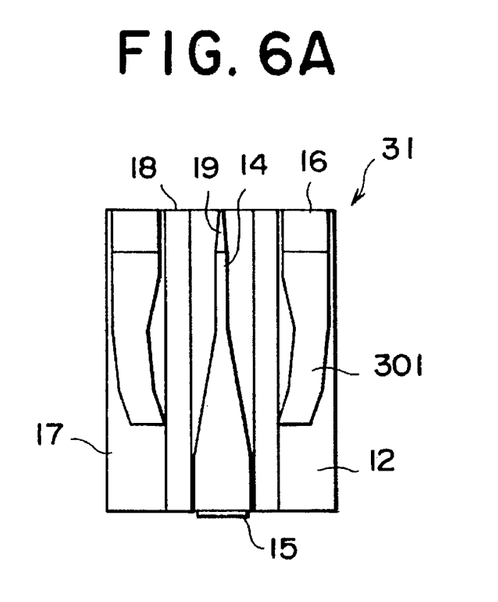
FIGS. 6A and 6B show a plan view of a magnetic head slider according to a first embodiment of the present invention and an enlarged plan view of the side rail shown in FIG. 6A, respectively.
Figure 6B:
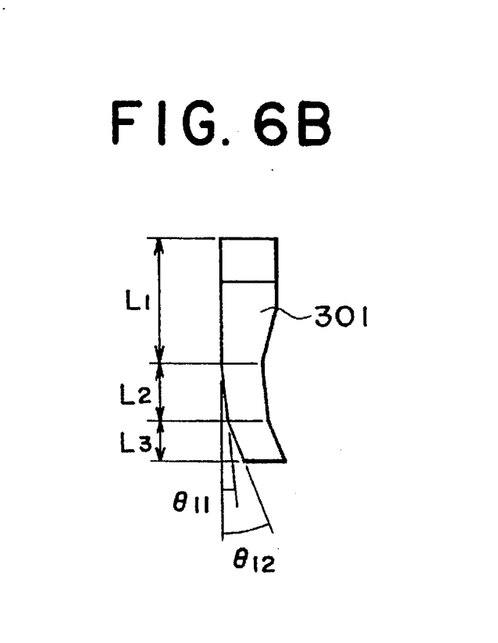

Referring to FIGS. 6A an 6B, FIGS. 7A and 7B, and FIGS. 8A and 8B, in which similar elements are designated by the same reference numerals, each of magnetic head sliders 31, 32 and 33 according to first, second and third embodiments of the present invention has, on an air bearing surface (ABS) 12 thereof, a pair of side rails 301, 302 or 303 having a slope 16 at the leading edge thereof, a central rail 14 having a slope 19 at the leading edge thereof, and a recess 17. A magnetic head 15 is attached to the trailing end surface of each of the sliders, with a magnetic gap thereof being disposed at the trailing edge of the central rail 14. In addition, the magnetic head slider 31 has a pair of mechanically formed grooves 18 running parallel to each other in the ABS 12 and interposed between the side rails 301 and the central rail 14. The grooves 18 should be formed if the recess 17 cannot be formed to a sufficient depth by etching. These sliders 31, 32 and 33 are supported by an unillustrated magnetic head support mechanism of a rotary actuator type at the surface opposite to the ABS 12.

In the magnetic head slider 31 according to the first embodiment shown in FIG. 6A, side rails 301 extending parallel to the longitudinal axis of the slider are provided on both sides of the slider 31, with the central rail 14 disposed therebetween. Each of the side rails 301 has a first, leading region L1 extending substantially in the direction of the longitudinal axis of the slider 31, a second, intermediate region L2 extending in the direction deviated from the direction of the longitudinal axis of the slider toward the longitudinal axis by angle Θ11, and a third, trailing region L3 extending in the direction deviated from the direction of the longitudinal axis of the slider toward the longitudinal axis by angle Θ12 (Θ12>Θ11). The width of the second and third regions L2 and L3 is smaller than the width of the majority of the first region L1.

The trailing edge of the trailing region L3 of the side rails 301 is located at the position significantly ahead of the trailing edge of the slider 31. If a track geometry is employed in which the skew angle of the magnetic head slider 31 is zero at the innermost track and increases as the slider 31 moves toward the outermost track, it is preferable that the angle Θ11 be equal to skew angle at the track located at the center of the track area. In this case, the angle Θ12 is preferably equal to skew angle at the outermost track.

The central rail 14 has a leading region of a small width generating a small pressure, an intermediate region of a tapered width increasing as viewed toward the trailing edge of the slider 31, and a trailing region of a large width generating a large pressure. By this configuration, the effect of variations in pressure due to variations in the air velocity can be reduced compared to the case of a central rail having a tapered width increasing at a constant rate as viewed from the leading edge to the trailing edge. This configuration decreases the dependency of the pressure acting on the central rail on the circumferential velocity, thereby obtaining a uniform floating height.

In the three-rail slider of the present embodiment, the length of the side rails 301 is smaller than that of the central rail 14, which prevent the magnetic head slider from contacting the medium surface even when the slider 31 rolls. However, the side rails 301 should have a sufficient length so as to obtain a pitch stiffness thereof.

With the configuration as described above, the pair of side rails 301 have a structure in which each of the side rails 301 is bent toward the other of the side rails 301 at a plurality of positions. The amount of bending angle is smaller at a position near the leading edge and larger at a position near the trailing edge. The structure in which the bending angle is small at the first position near the leading edge provides the advantage that the total compression length of the ABS 12 is low compared to the case of a large bending angle at the first position, when the magnetic head slider resides over the outermost track so as to have a larger circumferential velocity. Namely, the small bending angle at the first position cancels the increase in the floating height caused by the increase in the circumferential velocity, thereby providing constant floating height over all the tracks. On the other hand, the structure in which the bending angle at the second position near the trailing edge of the side rail 31 is large provides the advantage that the side rails 31 are located near the central rail 104.

Figure 11A:
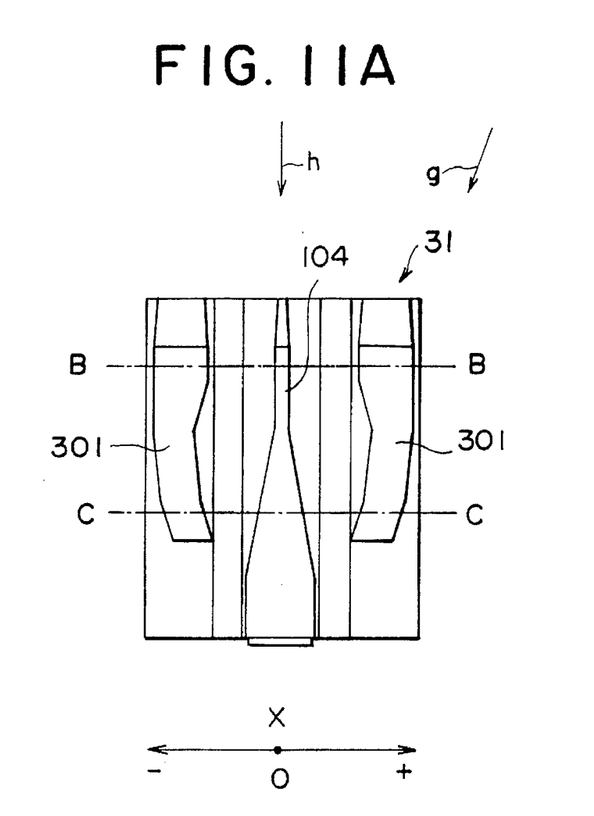
FIG. 11A again shows the plan view of FIG. 6A with lines B—B and C—C and X-coordinate for representing pressure distribution profiles.
Figure 11B:
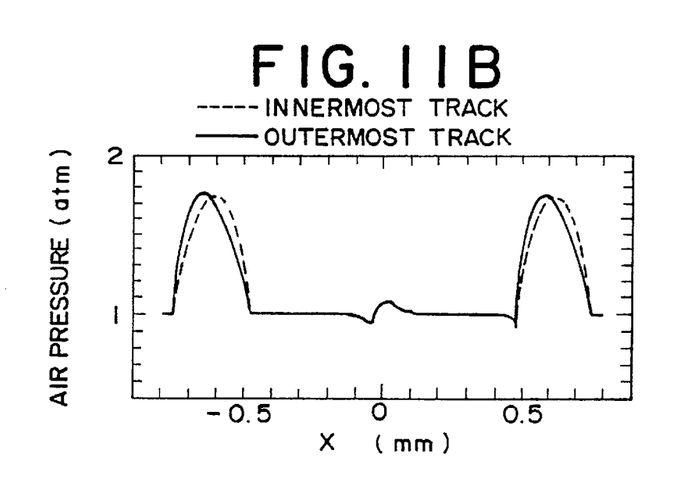
FIGS. 11B and 11C are graph showing pressure distribution profiles taken along lines B—B and C—C, respectively, of FIG. 11A.
Figure 11C:
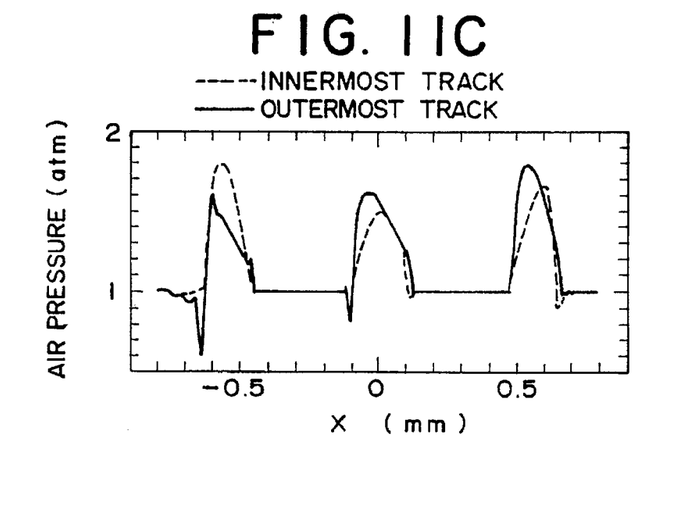

Referring to FIGS. 11A, 11B and 11C, the function of the side rails 301 in the first embodiment will be described. FIGS. 11B and 11C show pressure distribution along the lines B—B and C—C, respectively, in FIG. 11A, which again shows the magnetic head slider of FIG. 6A. In FIG. 11A, the direction of the air at the outermost track is shown by arrow "g", while the direction of the air flow shown by arrow "h" at the innermost track is parallel to the longitudinal axis of the slider 31. In FIG. 11A, X-coordinate is positive as viewed toward the disk center, with the origin thereof being at the center of the slider 31.

In FIGS. 11B and 11C, dotted lines represent the pressure distributions at the innermost track while the solid lines represent the pressure distributions at the outermost track. As understood from these drawings, for each of the rails, the pressure distribution at the innermost track is in symmetry with respect to the central axis of each of the rails, while the pressure distribution for each of the rails at the outermost track deviates from the symmetry to roll the slider such that the outer side of the each of the rails is raised compared to the inner side of the each of the rails.

However, as shown in FIG. 11C, the pressure acting on the inner side rail is raised at the outermost track as compared to the case at the innermost track, while the pressure acting on the outer side rail is reduced at the outermost track as compared to the case at the innermost track. This is because the air flow "g" at the outermost track is directed along the trailing region (L3 in FIG. 6B) of the inner side rail to generate an increased compression length, while the air flow "g" at the outermost track generates a reduced pressure acting on the outer side rail due to the reduced compression length of the trailing region of the outer side rail.

Accordingly, the structure of the side rails according to the present embodiment cancels the roll generally caused by each of the rails at the outermost track. In other words, the dependency of the local stiffness on the track radius can be decreased so that the amount of roll or variations in roll of the slider can be minimized over all the track area, which makes it possible to maintain the stable attitude of the floating magnetic head slider.

Turning back to FIGS. 7A and 7B, the magnetic head slider 32 according to the second embodiment has two side rails 302 and a central rail 14 which is similar to that of the first embodiment. Each of the side rails 302 has a first, leading region M1 having a first, large width in most of the region M1 and extending parallel to the longitudinal direction of the slider 32. The first region M1 has a second width smaller than the first width at the trailing edge thereof. Each of the side rails 302 further has a second region M2 having the second width and extending in the direction deviated from the direction of the longitudinal axis of the slider toward the longitudinal axis by angle $\Theta 21$, a third region M3 having the second width and extending in the direction rotated from the direction of the longitudinal axis of the slider toward the longitudinal axis by angle $\Theta 22$ ($\Theta 21 < \Theta 22$), and a fourth, trailing region M4 having the second width and extending in the direction deviated from the direction of the longitudinal axis of the slider toward the longitudinal axis by angle $\Theta 23$ ($\Theta 22 < \Theta 23$).

Figure 7A:
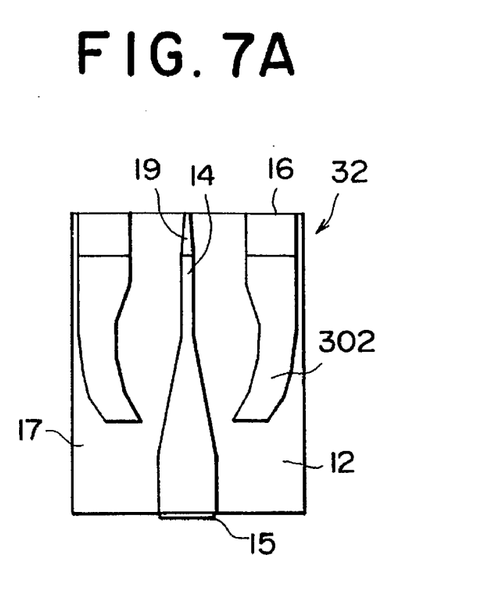
FIGS. 7A and 7B show a magnetic head slider according to a second embodiment of the present invention, using views of type similar to FIGS. 6A and 6B.
Figure 7B:
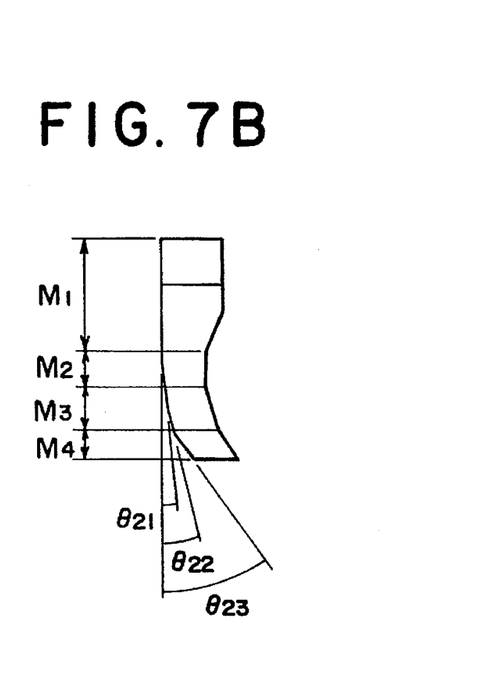

Angle $\Theta 21$ is approximately equal to the skew angle at a track located outward from the innermost track by an amount corresponding to one third of the radial distance between the innermost track and outermost track. Angle $\Theta 22$ is approximately equal to the skew angle at a track located outward from the innermost track by an amount corresponding to two thirds of the radial distance between the innermost track and outermost track. Angle $\Theta 23$ is approximately equal to the skew angle at the outermost track.

In the second embodiment, air flow at the respective tracks is directed in the directions of the respective regions of the inner side rail. Accordingly, the attitude of the slider is further improved over the first embodiment.

Referring back to FIGS. 8A and 8B, the magnetic head slider 33 according to the third embodiment has two side rails 303 and a central rail 14 which is similar to that of the first embodiment. Each of the side rails 303 has a leading half region N1 and a trailing half region N2. The leading half region N1 extends substantially parallel to the longitudinal axis of the slider 33 while the second half region N2 has a arcuate shape curved toward the longitudinal axis of the slider 33. The arcuate shape of each side rail 303 has a radius and a center of curvature such that the angle (referred to as tangential angle hereinafter) between the longitudinal axis of the slider and the tangential line of the arc varies in accordance with a variation in the skew angle between the innermost track and the outermost track. In detail, the center of the curvature 01 is offset from the longitudinal center of the side rail (having a length N) toward the leading edge by an amount $\Delta h$ ($\Delta h > 0$) so that the tangential angle $\Theta 31$ of the arc at the leading edge of the trailing region N2 is roughly equal to skew angle at the intermediate track, and the tangential angle $\Theta 32$ of the arc at the trailing edge of the side rail is roughly equal to skew angle at the outermost track. The radius $\rho 1$ of the curvature is determined such that the tangential angle follows the variation in the skew angle in the whole track area of the medium.

Figure 8A:
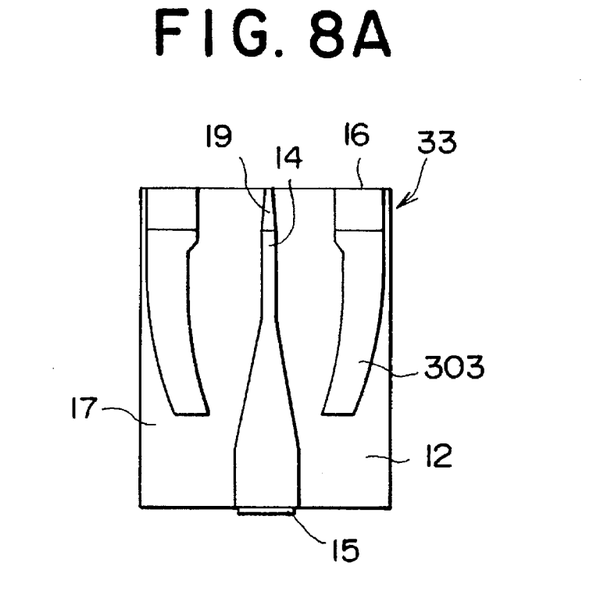
FIGS. 8A and 8B show a magnetic head slider according to a third embodiment of the present invention, using views of type similar to FIGS. 6A and 6B.
Figure 8B:
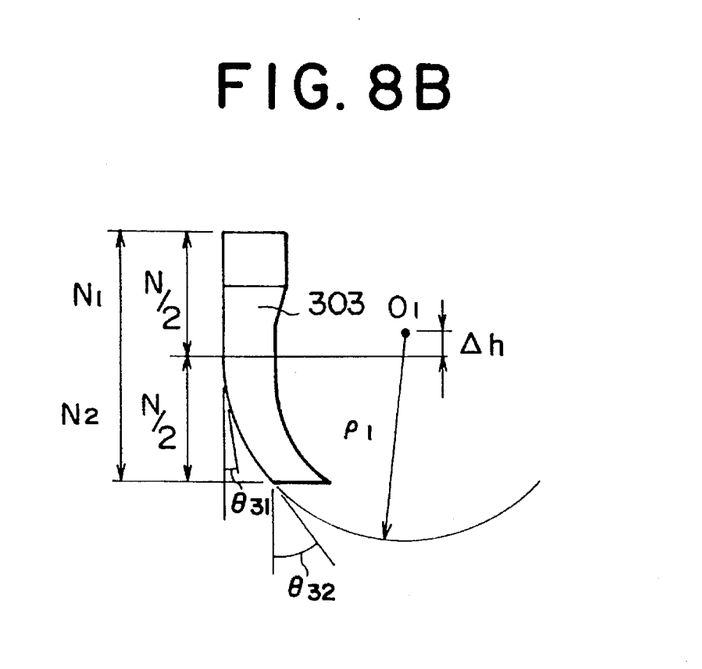

The magnetic head slider of the present embodiment provides advantages similar to those provided by the first and second embodiments in which the side rails are bent at a plurality of positions. Namely, a constant floating height of the magnetic head slider and a stable floating attitude can be provided similar to the first and second embodiments. Since the constant floating height can be obtained by changing the curvature of the side rails in accordance with track geometry, flexibility of design for the slider can be increased. In addition, since the smooth boundary of the rails prevents the generation of burrs in the slider during etching process, the throughput of the slider can be increased.

Referring to FIGS. 9A, 9B and 9C and FIGS. 10A and 10B, there are shown magnetic head sliders 40 and 50 according to a fourth and a fifth embodiments of the present invention. Each of the magnetic head sliders 40 and 50 according to the fourth and fifth embodiments of the present invention has, on an ABS 12 thereof, a pair of side rails 301 similar to those in the first embodiment, a central rail 401 or 402, a recess 17, and mechanically formed grooves 18. As previously described, the grooves 18 should be formed if the recess 17 cannot be formed to a sufficient depth by etching. These sliders 40 and 50 are supported by an unillustrated magnetic head support mechanism of a rotary actuator type at the surface opposite to the ABS 12.

Figure 9A:
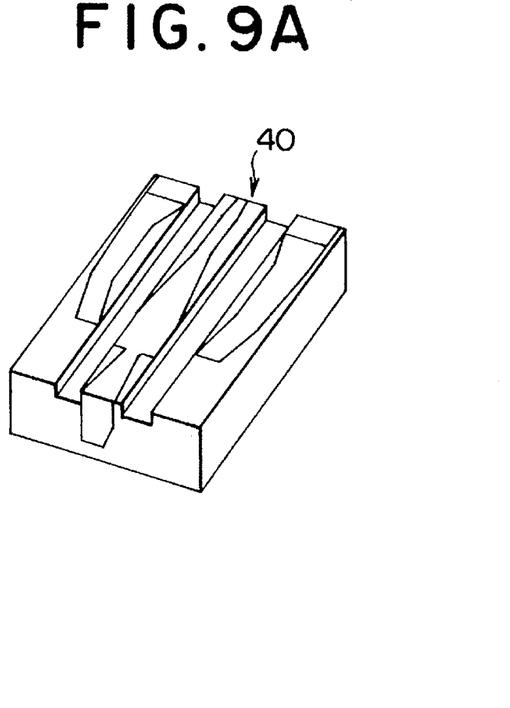
FIG. 9A is a perspective view of a magnetic head slider according to a fourth embodiment of the present invention.
Figure 9B:
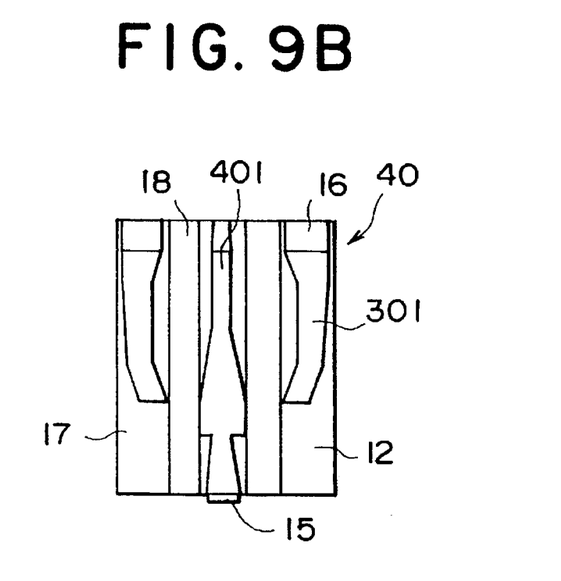
FIG. 9B is a plan view of the magnetic head slider shown in FIG. 9A.
Figure 9C:
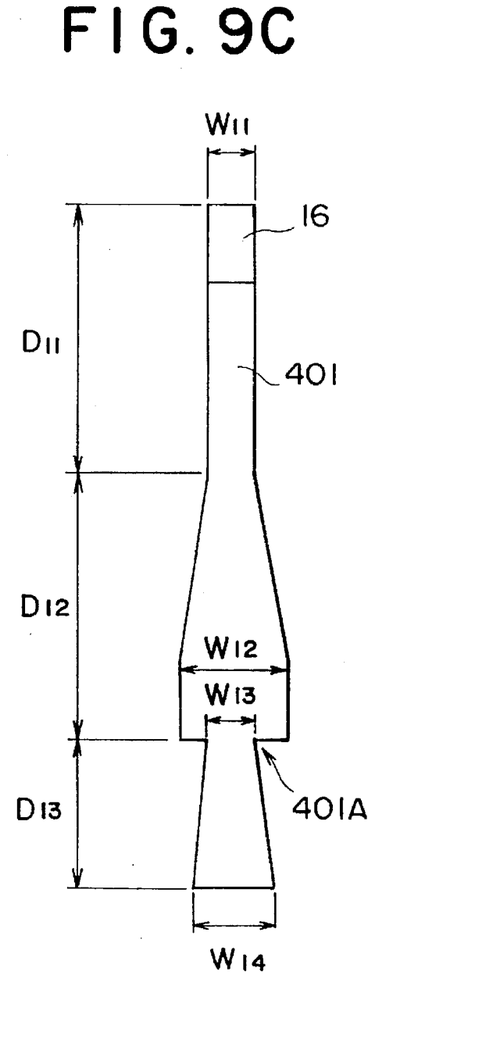
FIG. 9C is an enlarged plan view of the central rail shown in FIG. 5B.

In the fourth embodiment shown in FIGS. 9A, 9B and 9C, the central rail 401 has a first, leading region D11 including a slope 16 and having a uniform small width W11, a second, tapered region D12 including a tapered width part having a linearly increasing width from the width W11 to a width W12 as viewed toward the trailing edge of the slider 40 and a constant width part following thereto, a neck 401A having a small width W13, a third, tapered region D13 having a linearly increasing width from a width W13 to a width W14 as viewed toward the trailing edge thereof. The trailing edge of the third region D13 of the central rail 401 is flush with the trailing edge of the ABS 12, at which a magnetic head 15 has a magnetic gap thereof.

The amount of decrease (W12–W13) in the width at the neck 401A, and the width W14 at the trailing edge of the central rail 401 are determined based on a theoretical or designed floating height of the magnetic head slider 40, a desired constant floating height, the size of the magnetic head 15 formed at the trailing edge of the slider 40, and the like. If the width W13 of the central rail 401 at the neck 401A is too small, a sufficient floating height cannot be obtained. On the other hand, when the width W13 of the neck 401A is too large, the effect provided by changing the width of the central rail 401 is decreased so that a constant floating height cannot be obtained.

The longitudinal position of the neck 401A in the central rail 401 is also determined by taking a designed floating height into consideration. If the neck 401A is located more closely to the leading edge, the floating height will be too small. On the other hand, if the neck 401A is located more closely to the trailing edge, the effect provided by changing the width of the central rail 402 is decreased so that it will be difficult to obtain a constant floating height. In order to solely obtain a constant floating height, it would be preferred that the width of the central rail 401 be kept constant between the neck 401A and the trailing edge, or else, be decreased toward the trailing edge. However, to maintain the pitch stiffness of the slider 40 and to provide a sufficient width for bearing the magnetic head 15, it is preferred that the width of the central rail 401 be increased toward the trailing edge thereof, as disclosed in this embodiment.

Figure 10A:
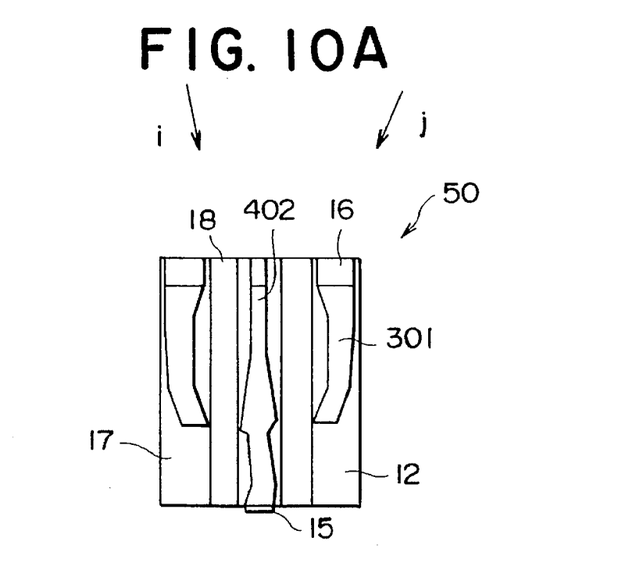
FIG. 10A is a plan view of a magnetic head slider according to a fifth embodiment of the present invention.
Figure 10B:
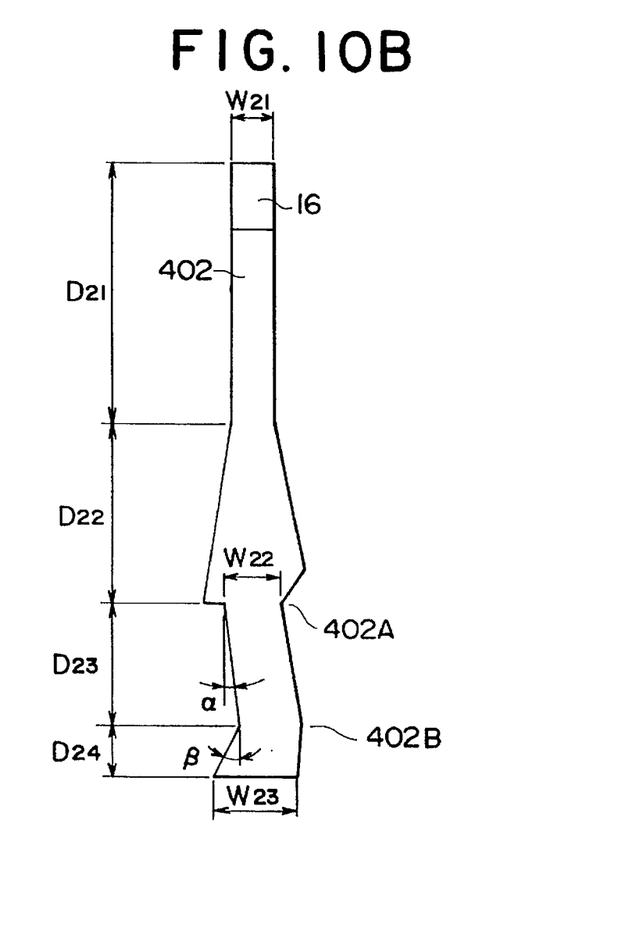
FIG. 10B is an enlarged plan view of the central rail shown in FIG. 10A.

In the fifth embodiment shown in FIGS. 10A and 10B, the floating head slider 50 has the same configuration as that of the fourth embodiment except for the structure of the central rail 402. The central rail 402 in this embodiment has a first, leading region D21 including a slope 16 and having a uniform small width W21, a second, tapered region D22 having a linearly increasing width as viewed toward the trailing edge of the slider 50, a neck 402A having a width W22, a third, oblique region D23 having the width W22 and extending in a direction deviated from the direction of the longitudinal axis of the slider 50 toward the innermost track by angle α, and a trailing, tapered region D24 extending in a direction deviated from the direction of the longitudinal axis of the slider 50 toward the outermost track by angle β and having an increasing width as viewed toward the trailing edge thereof.

By the configuration as described above, the central rail 402 is bent at the neck 402A to be directed in the direction along the direction of the air flow at the innermost track, indicated by arrow "i". In the vicinity of the trailing edge, the central rail 402 is reversely bent at the position 402B to be directed in the direction along the air flow at the outermost track, indicated by arrow "j". Namely, the angle α of the first bending is determined based on the skew angle at the innermost track while the angle β of the second bending is determined based on the skew angle at the outermost track. The position 402B of the second bending is determined based on the angle β of the first bending and the angle α of the second bending.

If the position 402B of the second bending is located more close to the trailing edge, the floating height at outer tracks decreases, while if the position of the second bending is located more closely to the neck 402A, the floating height at inner tracks decreases. These structure would deteriorate the floating characteristics of the slider at constant floating height. The position 402B of the second bending is determined in accordance with a desired track geometry, taking account of the position of the neck 401A and the amount of variations in the width of the central rail.

In the fourth and fifth embodiments of the present invention, the central rail 401 or 402 has the neck or small width portion adjacent to the tapered region where the positive pressure produced in the ABS 12 is at a maximum, and the small width is kept constant or gradually increased toward the trailing edge. This configuration provides small variations in the pressure due to variations in the velocity of the air flow compared to the first through third embodiments.

The configuration of the fifth embodiment is especially effective in magnetic disk drives which employ a track geometry such that the skew angle has a significant minus value at the innermost track. The third region D23 extends along the air flow at the innermost track to thereby prevent the bearing pressure at the innermost track from decreasing while the trailing region D24 extends along the air flow at the outermost track to thereby prevent the bearing pressure at the outermost track from decreasing, thereby maintaining pitch stiffness in the whole track area.

Figure 12:
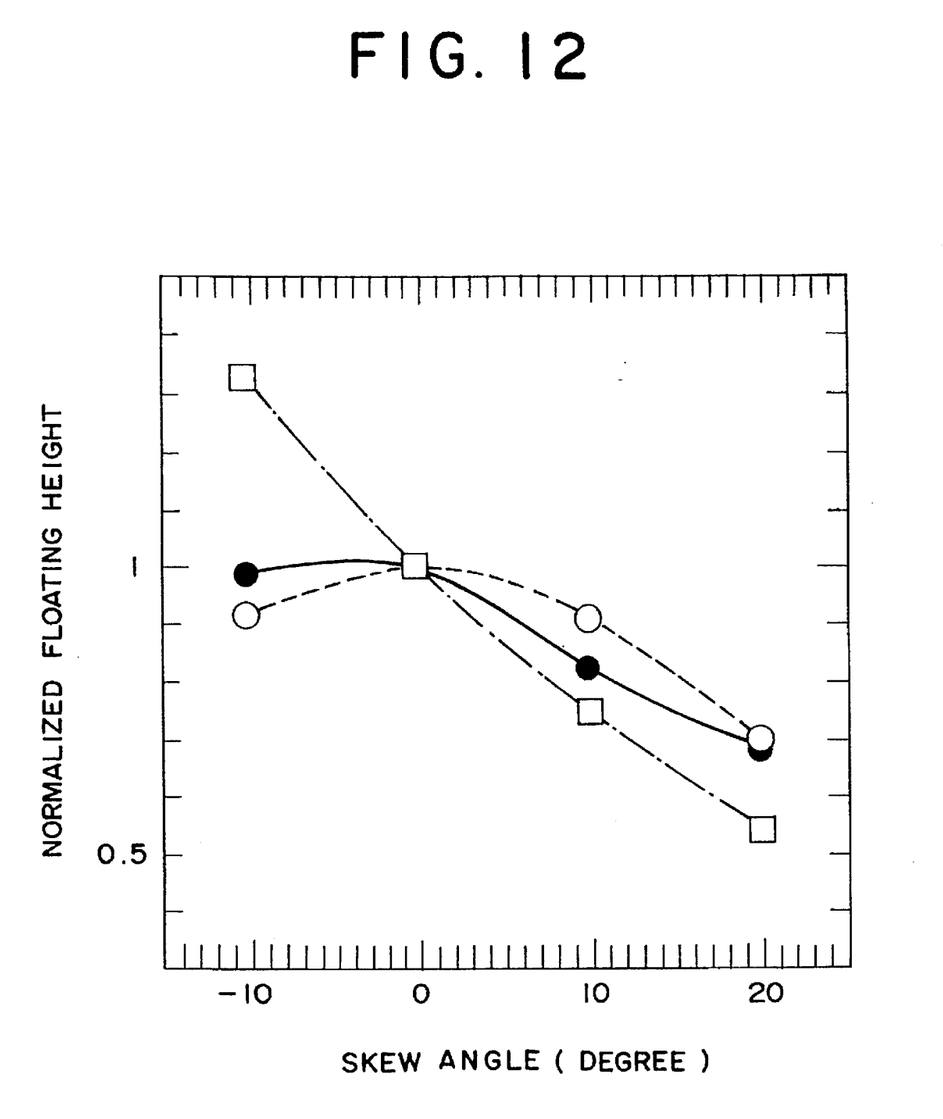
FIG. 12 is a graph showing floating height dependency on skew angle in the magnetic head sliders.
Figure 13:
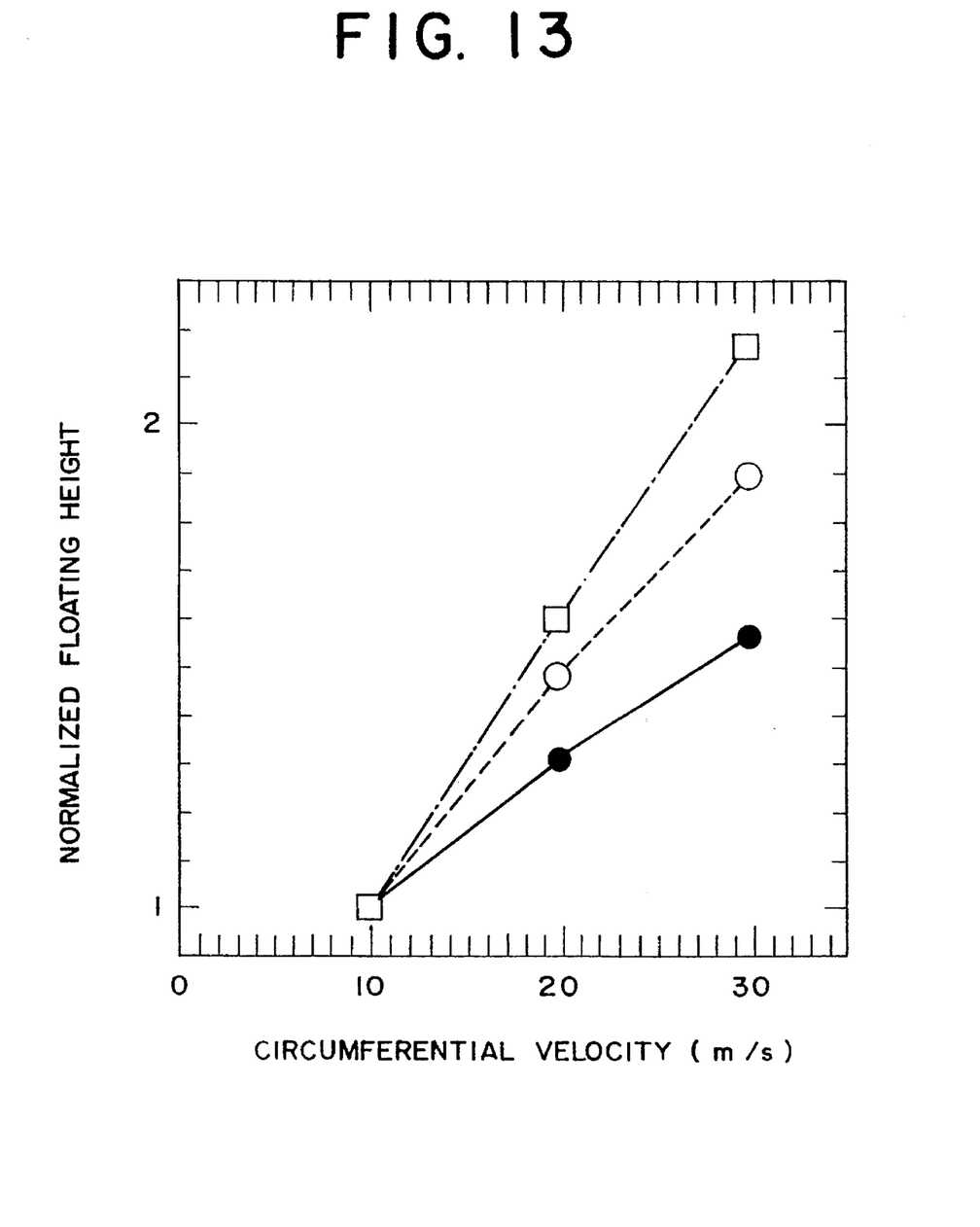
FIG. 13 is a graph showing floating height dependency on circumferential velocity in the magnetic head sliders.
Figure 14:
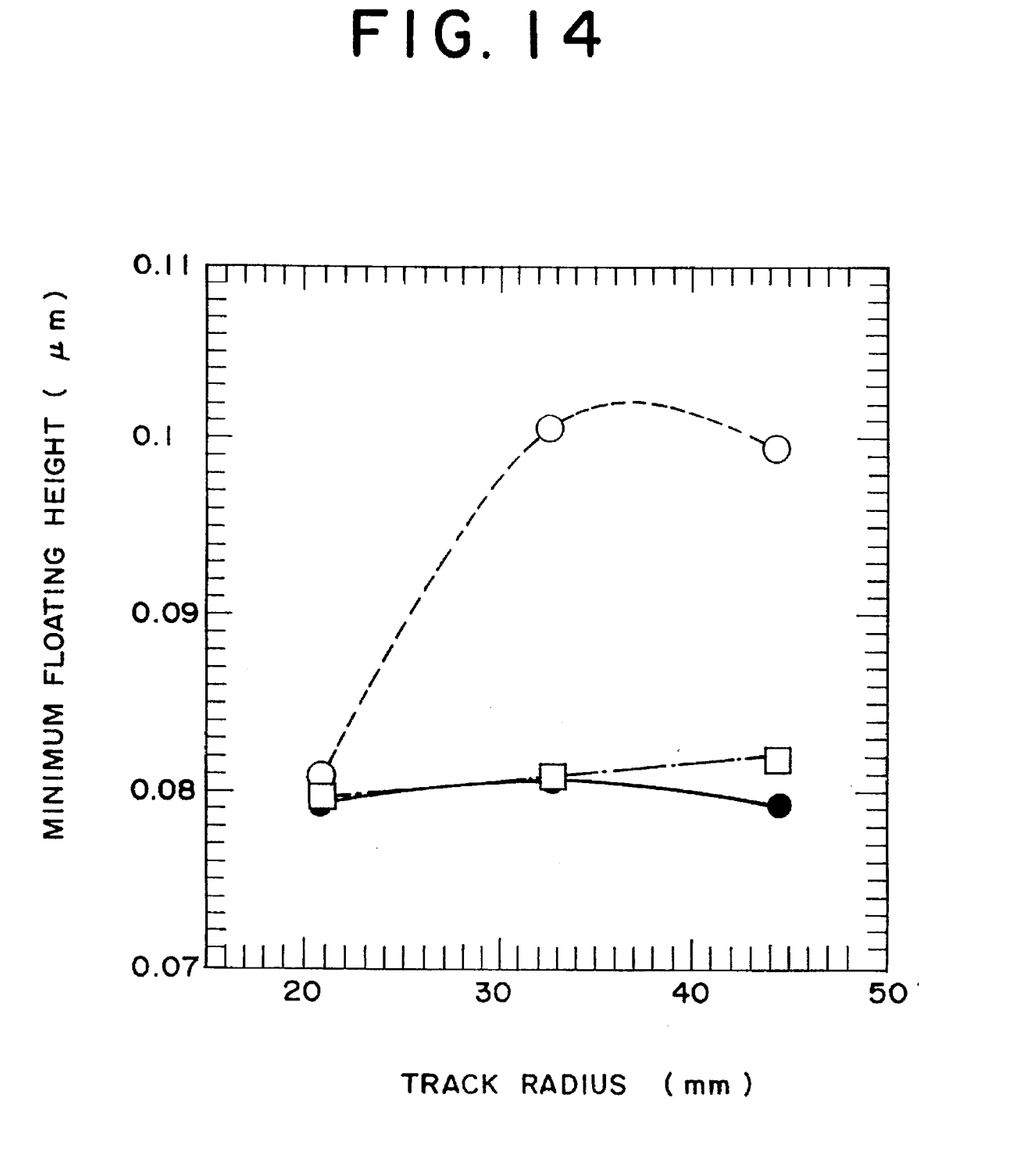
FIG. 14 is a graph showing minimum floating height dependency on track radius in the magnetic head sliders.

FIGS. 12 and FIG. 13 show changes in normalized flying height in the magnetic head slider according to the fifth embodiment of the present invention as functions of skew angle and circumferential velocity, respectively. Changes in floating height in conventional sliders are also shown therein for comparison. FIG. 14 also shows minimum floating height dependence on track radius for a magnetic head slider according to the fifth embodiment and for conventional ones. In the drawings, the solid lines represent the characteristics of the fifth embodiment while the dotted lines and chain lines represent the characteristics of a conventional three-rail slider and a conventional two-rail slider, respectively.

As will be understood from FIGS. 12 and 13, the floating height of the magnetic head slider according to the present invention exhibits a reduced dependency on skew angle and circumferential velocity as compared to those of the conventional sliders. As a result, as shown in FIG. 14, variations in minimum floating height of the slider depending on radial position can be decreased, thereby permitting a constant floating height to be obtained which is essential for obtaining a high density recording.

What is claimed is:

1. A floating head slider for floating over the surface of a magnetic storage medium, said slider comprising an air bearing surface having a central longitudinal axis, said air bearing surface having a leading edge and a trailing edge extending perpendicular to said longitudinal axis, a pair of side rails disposed on said air bearing surface and in symmetry to each other with respect to said longitudinal axis, each of said side rails having a first region disposed adjacent to said leading edge and extending parallel to said longitudinal axis, a second region extending from said first region in a first direction at a first angle to the direction of said longitudinal axis toward said longitudinal axis, and a third region extending from said second region in a second direction at a second angle to the direction of said longitudinal axis toward said longitudinal axis, said second angle being larger than said first angle, each of said side rails also including a respective outer edge adjacent to a respective outer edge of said air bearing surface, the respective outer edges of said side rails each having at least two contiguous portions, one of said two contiguous portions extending to the other portion of said two contiguous portions at an angle to the direction of said longitudinal axis toward said longitudinal axis, said other portion extending at another and larger angle to the direction of said longitudinal axis than that of said one portion.

2. A floating head slider according to claim 1, wherein each of said side rails has a fourth region extending from said third region in a third direction at a third angle to the direction of said longitudinal axis toward said longitudinal axis, said third angle being larger than said second angle.

3. A floating head slider according to claim 2, wherein said third angle is substantially equal to a skew angle existing when said floating head slider is positioned over an outermost track of said storage medium.

4. A floating head slider according to claim 1, wherein said second angle is substantially equal to a skew angle existing when said floating head slider is positioned over an outermost track of said storage medium.

5. A floating head slider according to claim 1, and further comprising a central rail disposed on said air bearing surface between said pair of side rails.

6. A floating head slider according to claim 5, wherein said central rail has a fourth region having a constant width and disposed adjacent to said leading edge, a fifth region extending from said fourth region and having an increasing width as viewed toward said trailing edge, and a sixth region extending from said fifth region and having a constant width.

7. A floating head slider for floating over the surface of a magnetic storage medium, said slider comprising an air bearing surface having a central longitudinal axis, said air bearing surface having a leading edge and a trailing edge extending perpendicular to said longitudinal axis, a pair of side rails disposed on said air bearing surface and in symmetry to each other with respect to said longitudinal axis, each of said side rails having a first region disposed adjacent to said leading edge and extending substantially parallel to said longitudinal axis, and a second region extending from said first region and terminating at a termination of said side rail, said second region having a concave arcuate shape as viewed from the longitudinal axis, each of said side rails also having a respective arcuate outer edge potion, adjacent a respective outer edge of said air bearing surface, in the second regions of said side rails.

8. A floating heading slider according to claim 7, wherein said arcuate shape includes a circular portion having a center located closer to said leading edge than to said trailing edge.

9. A floating head slider according to claim 7, and further comprising a central rail disposed on said air bearing surface between said pair of side rails.

10. A floating head slider according to claim 7, wherein said central rail has a third region having a constant width and disposed adjacent to said leading edge, a fourth region extending from said third region and having an increasing width as viewed toward said trailing edge, and a fifth region extending from said fourth region and having a constant width.

11. A floating head slider for floating over the surface of a magnetic storage medium, said slider comprising an air bearing surface having a central longitudinal axis, said air bearing surface having a leading edge and a trailing edge extending perpendicular to said longitudinal axis, a pair of side rails disposed on said air bearing surface and in symmetry to each other with respect to said longitudinal axis, and a central rail disposed on said air bearing surface between said pair of side rails and separated from said side rails by recesses, said central rail having a first region adjacent to said leading edge, a second region adjacent to said trailing edge, a third region in-between said first and second regions, and a neck disposed between said first region and second region, said first region extending substantially parallel to said longitudinal axis and having edges which extend substantially parallel to said longitudinal axis, said third region having a portion having a width which increases toward said trailing edge, said neck having a width smaller than the width of said third region and said second region adjacent to said neck, said second region having two edges which extend from said trailing edge and terminate at said neck, said two edges of said second region extending from said trailing edge at an angle to the direction of said longitudinal axis toward said longitudinal axis, said two edges of said central rail becoming closer to said longitudinal axis as they approach said neck.

12. A floating head slider according to claim 11, wherein said second region has an increasing width as viewed toward said trailing edge.

13. A floating head slider according to claim 11, and further comprising a third region, wherein said second region extends at an angle to the direction of said longitudinal axis in a first rotational direction, and wherein said third region extends at an angle to the direction of said longitudinal direction in a second rotational direction, said first rotational direction being opposite to said second rotational direction.

14. A floating head slider according to claim 13, wherein said second region extends at an angle to the direction of air flow at an innermost track of said medium and said third region extends at an angle to the direction of air flow at an outermost track of said medium.

* * * * *

UNITED STATES PATENT AND TRADEMARK OFFICE
CERTIFICATE OF CORRECTION

PATENT NO. : 5,625,513
DATED      : April 29, 1997
INVENTOR(S): UTSUNOMIYA ET AL It is certified that error appears in the above-indentified patent and that said Letters Patent is hereby corrected as shown below:

Claim 7, Col. 10, line 6, "potion" should be --portion--

Claim 8, Col. 10, line 9, "heading" should be --head--

Signed and Sealed this

Nineteenth Day of May, 1998

*Attest:*

BRUCE LEHMAN

*Attesting Officer*    Commissioner of Patents and Trademarks